Oct. 6, 1931.  E. J. MARTINEAU  1,826,009
ICE CREAM DIPPER
Filed June 14, 1930
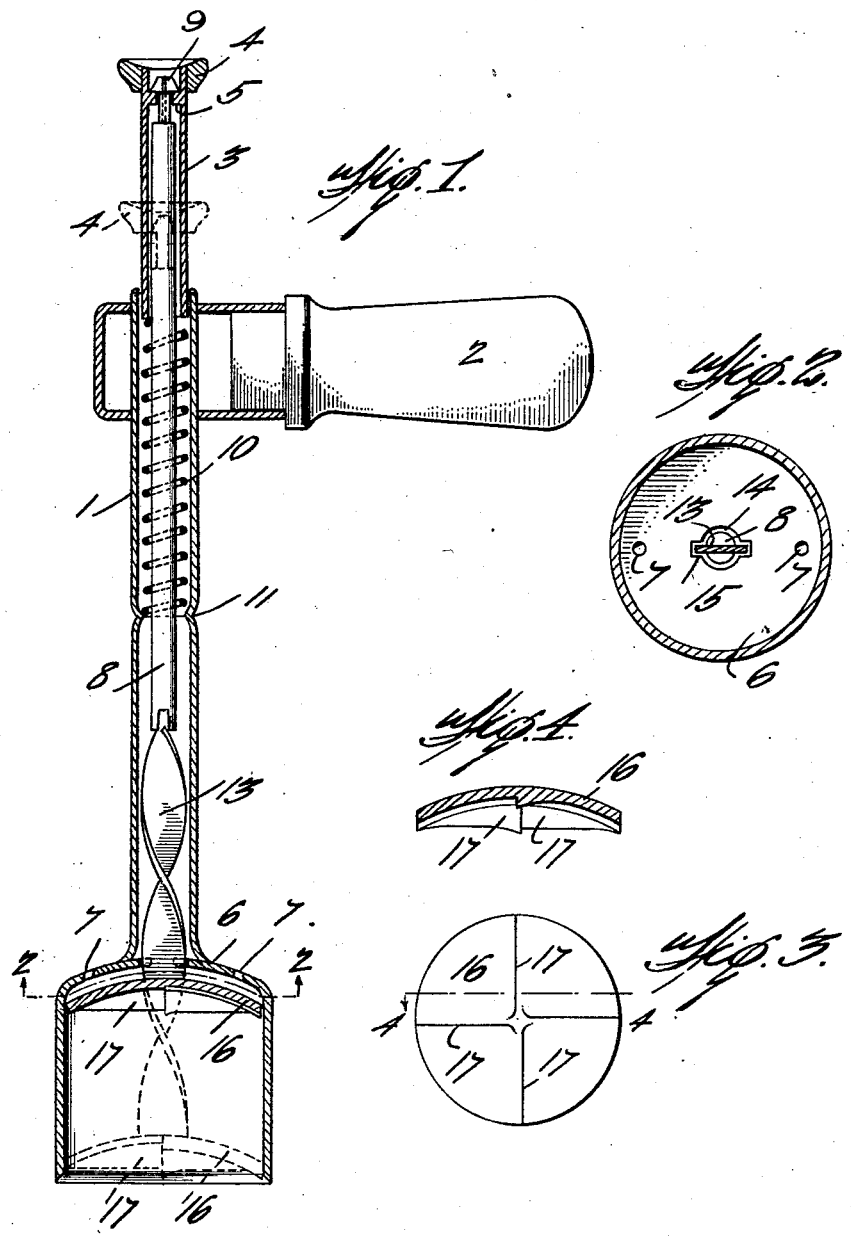
INVENTOR
EDWARD J. MARTINEAU
BY
F. P. Gorin
ATTORNEY Patented Oct. 6, 1931

1,826,009

UNITED STATES PATENT OFFICE

EDWARD J. MARTINEAU, OF SEATTLE, WASHINGTON

ICE CREAM DIPPER

Application filed June 14, 1930. Serial No. 461,180.

This invention relates to improvements in ice cream dippers and the like, and has for its principal object to improve upon the construction shown and described and claimed in my Patent No. 1,721,045, issued to me on the 16th day of July, 1929.

In the construction shown in my said patent, I have found that the mass of ice cream within the dipper often hung to the ejector plate when the ejector was thrust forward so that it was necessary to shake the device or jolt it to dislodge the ice cream. The particular improvement, therefore, is to correct this defect in this present invention.

A further object is to provide an ejector plate which will free itself from the ice cream through the same manual movement as before.

In the drawings:—

Figure 1 is a side elevation of the device partly in section.

Figure 2 is a bottom plan view of the cup.

Figure 3 is a similar view of the ejector shell.

Figure 4 is a sectional view taken upon the line 4—4 of Figure 3.

Referring now more particularly to the drawings, reference numeral 1 represents a tubular member which constitutes a frame, to which is affixed a handle 2. Slipped within the tubular member is another tubular member 3 having a thumb piece 4 at its upper end and an annular flange 5 within it. To the lower end of the tubular member 1 is secured a cup 6 having air vents 7 in its top. 8 is a stem whose upper end terminates in a split head 9 and is tapered as shown so that in assembling the stem 8 may be thrust upwardly, causing the tapered sides of the split head 9 to contact with the flange 5, and upon further thrusting of the stem 8 to cause the edges of the split head 9 to move toward each other and thus allow the head to assume its position with respect to the flange, as shown in Figure 1.

Surrounding the stem 8 is a coil spring 10, one of whose ends bears against a depression 11 in the tube 1, and the other end of the spring bears against the bottom edge of the smaller tubular member 3. The lower end of the stem 8 is channeled so that the upper edge of the blade 13 may be thrust into the channel. The roof of the cup 6 is bored through, as at 14, and slots 15 are cut into the cup and communicate with the bore 14 so that by grasping the handle 2 and pressing downwardly with the thumb upon the thumb piece 4, the blade will be caused to moved ownwardly and at the same time caused to rotate.

Secured to the lower end of the blade 13 is a pusher plate 16, whose undermost side is ribbed, as indicated at 17. The surface on one side of each rib slants upwardly toward the center line of the shell until it reaches one side of the rib (see Figure 4) so that as the shell is turned in clockwise direction, as seen in Figure 3, the slanted or filled-in portions will have a cam-like action upon the mass of ice cream within the cup and will force the pusher plate to free itself from the mass of ice cream and allow air to enter between the mass of ice cream and the under side of the pusher plate, instead of merely wiping around upon the mass of ice cream, as it did in the construction shown in my former patent. The result of this is that since the pusher plate has assumed its position, as shown in Figure 1, the mass of ice cream will immediately fall away from the pusher plate.

While I have shown and described a particular form of embodiment of my invention, I am aware that many minor changes will suggest themselves to those skilled in the art without departing from the spirit and scope of my invention. I, therefore, desire to avoid being limited to the particular form of embodiment which I have hereinabove shown and described.

I claim:—

1. An ice cream dipper comprising a cup member, an ejector plate, ribs formed on the bottom of said plate, and means for reciprocating and rotating the plate simultaneously in the cup member whereby the ribs on said ejector plate will cause the plate to clear the ice cream upon continued rotation of said plate after ice cream has filled a container.

2. An ice cream dipper comprising a cup member formed with a beveled bottom edge, an ejector plate, ribs extending substantially radially on said plate, said ribs tapering gradually to the surface of the plate, and means for reciprocating and rotating the plate so that the tapered ribs will serve to separate the ice cream from said plate.

In testimony whereof I affix my signature.

EDWARD J. MARTINEAU.